United States Patent
Larson

(10) Patent No.: US 9,284,413 B2
(45) Date of Patent: Mar. 15, 2016

(54) PROCESS TO PRODUCE STABLE ALKOXY TERMINATED AMINOFUNCTIONAL SILICONE FLUIDS

(71) Applicant: WACKER CHEMICAL CORPORATION, Adrian, MI (US)

(72) Inventor: Michael Larson, Ypsilanti, MI (US)

(73) Assignee: Wacker Chemical Corporation, Adrian, MI (US)

( * ) Notice: Subject to any disclaimer, the term of this patent is extended or adjusted under 35 U.S.C. 154(b) by 126 days.

(21) Appl. No.: 14/081,247

(22) Filed: Nov. 15, 2013

(65) Prior Publication Data

US 2015/0141686 A1    May 21, 2015

(51) Int. Cl.
| | | |
|---|---|---|
| *B60C 1/00* | (2006.01) | |
| *C08G 77/38* | (2006.01) | |
| *C08G 77/26* | (2006.01) | |

(52) U.S. Cl.
CPC ............... *C08G 77/38* (2013.01); *C08G 77/26* (2013.01)

(58) Field of Classification Search
CPC ................................ C08G 77/398; C07F 7/08

USPC ........................................... 524/262; 423/472
See application file for complete search history.

(56) References Cited

U.S. PATENT DOCUMENTS

| | | | |
|---|---|---|---|
| 4,633,002 A | 12/1986 | Piskoti | |
| 5,077,421 A | 12/1991 | Selvig | |
| 6,254,811 B1 * | 7/2001 | Finger | ................... C08K 5/521 264/35 |
| 2008/0275194 A1 | 11/2008 | Schildbach et al. | |

FOREIGN PATENT DOCUMENTS

GB           2367556 A   *   4/2002

\* cited by examiner

*Primary Examiner* — Porfirio Nazario Gonzalez
*Assistant Examiner* — Kofi Adzamli
(74) *Attorney, Agent, or Firm* — Brooks Kushman P.C.

(57) ABSTRACT

T-aminoalkyl-functional organopolysiloxanes with defined viscosity can be reproducibly prepared without gelling by condensing an organopolysiloxane containing at least two Si-bonded hydroxyl groups with an aminoalkyltrialkoxysilane in the presence of an organic compound bearing one or more hydroxyl groups.

15 Claims, No Drawings

PROCESS TO PRODUCE STABLE ALKOXY TERMINATED AMINOFUNCTIONAL SILICONE FLUIDS

BACKGROUND OF THE INVENTION

1. Field of the Invention

The invention pertains to the production of polydimethylsiloxanes containing T-aminoalkylsiloxy groups.

2. Background of the Invention

Organopolysiloxanes containing aminoalkyl "T" units which serve as branch points in the polymer have many uses, for example as textile additives to improve softness and hand. Such organopolysiloxanes can also be used as curing agents in numerous polymer systems, such as polyurethanes, epoxy resins, polishes and the like.

These aminoalkyl-functional organopolysiloxanes (aminoalkyl-functional "silicones") have been produced by several methods in the past, but a preparation based on condensation of a silanol-stopped organopolysiloxane with an aminoalkyltrialkoxysilane has proven useful, as the raw materials are readily available at reasonable cost. During the condensation, silanol groups react with alkoxy groups in the presence of a catalyst to form a siloxane bond, with elimination of alcohol:

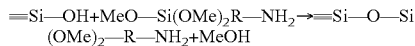

While beneficial for its overall simplicity and low raw ingredient costs, the method described above has some drawbacks as well. Due to the high alkoxy functionality of the aminoalkyltrialkoxysilane and also its initial reaction products, which contain unreacted alkoxy groups, the reaction mixture may exhibit an undesirable high viscosity, or may even gel, particularly if traces of water are present. Moreover, it is generally necessary to deactivate the catalyst once the desired molecular weight is obtained; otherwise, viscosity will continue to increase, and both initial product characteristics as well as storage stability may suffer. The aminoalkyl group-functional silane starting materials are widely used as adhesion promoters in numerous curable silicone compositions, and it has been noted, for example, that they appear to have the effect of a co-catalyst when used with conventional catalysts such as tin compounds. Whether due to this or for some other reason, it has been found that preparing T-aminoalkyl-functional silicones of reproducible viscosity is difficult. Minor process parameter excursions may result in a product with unusually high viscosity, to the point that the product may gel in the reactor itself, or may gel immediately following production.

It would be desirable to provide a method for the industrial preparation of T-aminoalkyl-functional silicones which avoid the aforementioned problems, which can produce T-aminoalkyl-functional silicones with a targeted viscosity in a reproducible manner.

SUMMARY OF THE INVENTION

It has now been surprisingly and unexpectedly discovered that T-aminoalkyl-functional silicones having a targeted viscosity can be prepared reproducibly if, before or during the condensation of a T-aminoalkyltrialkoxysilane with an OH-functional silicone fluid, one or more compounds containing hydroxyl groups are added.

DETAILED DESCRIPTION OF THE PREFERRED EMBODIMENTS

The T-aminoalkyl-functional silicones of the present invention are preferably the reaction products of an at least bis(silanol)-functional polyorganosiloxane (A) with an aminoalkyltrialkoxysilane (B). An alkanol corresponding to the alkoxy groups of the alkoxysilane is liberated during the condensation reaction, which is generally catalyzed. Other reactive ingredients such as other alkoxysilanes and alkoxy-functional organopolysiloxanes may be present as well.

The silanol-functional polyorganosiloxanes (A) may be linear or branched. In the case of branched silanol-functional organopolysiloxanes, the branch terminus or termini may also bear silanol groups; may be non-functional, e.g. trimethylsilyl-terminated; may bear alkoxy groups; or may bear groups which may be described as functional, but are not reactive or are poorly reactive under conditions of the condensation reaction. Examples of such groups include haloalkyl groups such as chloromethyl or chloropropyl groups, fluoroalkyl and particularly perfluoroalkyl groups, cyanoalkyl groups; alkanol groups such as hydroxypropyl groups; carboxylic acid groups or esters or salts thereof; and Si—C bonded alkenyl groups such as vinyl, allyl, w-hexenyl, and the like.

The silanol-functional organopolysiloxanes contain minimally two silicon-bonded hydroxyl groups, preferably only two silicon-bonded hydroxyl groups, and are preferably disilanol-stopped organopolysiloxanes, which are preferably linear, and correspond to the general formula:

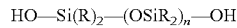

where n is from 10 to 10,000, more preferably 20 to 1000, and most preferably 20 to 500, and R is a hydrocarbon group.

Suitable R groups include $C_{1-20}$ alkyl groups such as methyl, ethyl, propyl, butyl, pentyl, hexyl, heptyl, octyl, nonyl, decyl, undecyl, dodecyl, octadecyl, and the like; alkenyl groups such as vinyl, allyl, propenyl, butenyl, and hexenyl; cycloalkyl groups such as cyclopentyl, methylcyclopentyl, cyclohexyl, methylcyclohexyl, norbornyl, and methylcyclohexylmethyl; aryl groups such as phenyl, diphenyl, naphthyl, and anthracenyl; alkaryl groups such as tolyl and xylyl; arylalkyl groups such as benzyl and α-, and β-phenylethyl, and the like. The R groups described above may be substituted or unsubstituted. Suitable substituents include those which are non-reactive or poorly reactive under the conditions of condensation of the silanol and aminoalkyltrialkoxysilane, and include, for example, carbon-bonded halo groups such as fluoro and chloro groups; carbon-bonded alkoxy groups such as methoxy, ethoxy, and propoxy; hydroxyl groups; cyano groups; carboxylic acid groups or their salts or esters; polyoxyalkylene groups, including both OH-terminated and hydrocarbon-terminated polyethers, and the like. Examples of such R groups include chloromethyl, chloropropyl, o, m, and p-chlorophenyl, perfluoropropyl, cyanomethyl, methoxymethyl, methoxyethyl, and the like.

Most preferably, the R groups of the α,ω-disilanols are alkyl or aryl groups, with methyl, ethyl, propyl, phenylethyl, and phenyl groups being preferred; methyl and phenyl groups being more preferred, and methyl groups being most preferred. Thus, the most preferable α,ω-disilanols ("disilanol stopped silicones") are α,ω-bis(hydroxy)polydimethylsiloxanes.

The silanol-functional silicones (A) may be of low molecular weight, e.g. oligomeric, or polymeric. The chain length (the value of n) is selected with a view to the product structure desired and the number of T-aminoalkylsiloxy units and other units to be incorporated into the polymer. For example, for a low molecular weight T-aminoalkyl-functional silicone with a given proportion of T-aminoalkyl groups, it may be appropriate to utilize a disilanol with, for example, from 10 to 20 siloxy groups, whereas for a higher molecular weight product with the same number of T-aminoalkyl groups in the polymer, a higher molecular weight disilanol would be used, for example one with 30 to 100 siloxy units. If it is desired to use a polydimethyldisilanol as a major component with a targeted number of aminoalkyl groups and yet provide R groups such as long chain alkyl groups or phenyl groups, then a relatively lower molecular weight oligomeric disilanol can be utilized in conjunction with a dialkoxysilane such as phenylmethyldimethoxysilane, the silanol groups being present in stoichiometric excess.

The aminoalkyltrialkoxysilanes (B) include any aliphatic or cycloaliphatic nitrogen-containing group which functions as a primary, secondary, or tertiary amino group, preferably a primary or secondary amino group. The aminoalkyltrialkoxysilanes preferably correspond to the formula

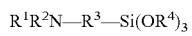
$R^1R^2N-R^3-Si(OR^4)_3$ where $R^1$ and $R^2$ are H, R, or where $R^1$ and $R^2$ together from an alicyclic ring including nitrogen, or where $R^1$ or $R^2$ and $R^3$ form an alicyclic ring containing nitrogen; $R^3$ is a divalent hydrocarbon radical which optionally contains one or more non-adjacent —NH—, —O—, or —S— groups and is preferably a divalent radical formed from R by removal of a hydrogen radical.

More preferred aminoalkyltrialkoxysilanes are those of the formula $HR^1N-R^3-Si(OR^4)_3$ where $R^1$ is other than H, and most preferably those of the formula $H_2N-R^3-Si(OR^4)_3$.

Also preferred are those of the formula:

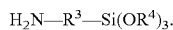
$H_2N-R'-NH-R'-Si(OR^4)_3$ where R' are divalent radicals derived from R such as ethylene, propylene, 1,2-cyclohexylene and 1,4-cyclohexylene, and the like, and $R^4$ is a $C_{1-8}$ alkyl group, preferably a $C_{1-4}$ alkyl group, and most preferably methyl or ethyl. Preferred aminoalkyltrialkoxysilanes include N-Cyclohexylaminomethyltriethyoxysilane (GENIOSIL® XL 926), N-Phenylaminomethyltrimethoxysilane (GENIOSIL® XL 973), N-(2-Aminoethyl)-3-aminopropyltrimethoxysilane (GENIOSIL® GF 9), N-Cyclohexyl-3-aminopropyl-trimethoxysilane (GENIOSIL® GF 92), 3-Aminopropyltriethoxysilane (GENIOSIL® GF 93), 3-Aminopropyltrimethoxysilane (GENIOSIL® GF 96), and 3-Ureidopropyltrimethoxysilane (GENIOSIL® GF 98), all available from Wacker Chemie, A.G., Munich, Germany.

Also suitable as aminoalkyltrialkyoxysilanes are those containing N-bonded cyclic amines such as N-piperidinyl, N-morpholinyl, N-pyrrolidinyl, and N-piperizinyl; and C-bonded nitrogen heterocycles such as 4-piperidinyl, 4-piperizinyl, 2- and 3-pyrrolidinyl, and 2- and 3-morpholinyl.

In addition to the disilanol and aminoalkyltrialkoxysilane, other reactive raw ingredients (C) may optionally be used as well. These include principally aminoalkylmonoalkoxysilanes (C1) having a single alkoxy group such as aminopropyldimethylmethoxysilane, which act as chain terminators providing terminal aminoalkyl groups; and aminoalkyldialkoxysilanes such as N-cyclohexylaminomethyl-methyldiethoxysilane (Geniosil® XL 924) and N-(2-aminoethyl)-3-amino-propylmethyldimethoxysilane (Geniosil® GF 95), which act as chain extending agents providing pendant aminoalkyl groups.

Further suitable as optional raw ingredients (C) include (C2) organotrialkoxysilanes which can react with the disilanol to introduce additional branch points; diorganodialkoxysilanes, which can act as chain extenders; and triorganoalkoxysilanes, which act as end-stoppers or chain terminating agents. Examples include trimethylmethoxysilane, dimethyldimethoxysilane, trimethylmethoxysilane, vinylmethyldimethoxysilane, vinyldimethylmethoxysilane, phenylmethyldimethoxysilane, diphenyldimethoxysilane, and their higher alkoxy analogues such as their ethoxy analogues. These further raw ingredients may also be used to supply further Si-bonded hydrocarbon or other groups such as long chain alkyl groups, aromatic groups, polyether groups, and the like.

When further raw ingredients (C) are used, they may be added at the same time as the disilanol (A) and aminoalkyltrialkoxysilane (B), or may be added sequentially, preferably prior to addition of the aminoalkyltrimethoxysilane (B). In the case of the use of optional further raw materials (C), the stoichiometry should be such that sufficient silanol groups are available to react with the aminoalkyltrialkoxysilane (B). Thus, for example, when reacting an oligomeric disilanol (A) with a diorganodialkoxysilane (C2), the silanol groups should be in stoichiometric excess over the alkoxy groups of (C1) to both avoid preparation of very high molecular weight products (unless this is desired), and to provide sufficient remaining silanol groups to react with the aminoalkyltrialkoxysilane (B).

The use of additional raw ingredients is not preferred. Preferably, the raw ingredients consist of disilanol (A) and aminoalkyltrialkoxysilane (B), or consist essentially of these, with only a minor portion of further raw ingredients (C) which provide only insubstantial changes in the polymer.

The stoichiometry of silanol groups in the disilanol (A) to alkoxy groups in the aminoalkyltrialkoxysilane (B) is preferably in the range of 0.5:3 to 2:1, more preferably 1:2 to 1.5:1, and yet more preferably about 1:1. Higher and lower ratios may be used as well. The particular stoichiometry may be set to provide the desired molecular weight and chemical make-up of the product. For example, when products still having alkoxy groups derived from, for example, the aminoalkyltrialkoxysilane, are desired to be present, the ratio of silanol groups of the disilanol (A) to alkoxy groups of the aminoalkyltrialkoxysilane (B) should be less than 1:1, for example 1:1.5 On the other hand, if it is desired for essentially all alkoxy groups of the aminoalkyltrialkoxysilane (B) to be reacted, then the ratio of silanol groups to alkoxy groups should be 1:1 or more, for example 1.1:1. These same considerations apply when further raw materials (C) are used.

The condensation reaction between disilanol (A) and aminoalkyltrialkoxysilane (B) and optional alkoxy-functional further raw materials (C) may be catalyzed or uncatalyzed. Catalysts are generally necessary. However, when exceptionally reactive α-silanes are used for raw materials (B) and (C), it is possible to proceed without the use of a catalyst. For example, the aminoalkyltrialkoxy silane (B) may be an α-silane such as aminomethyltriethoxysilane or aminomethyltrimethoxysilane. Catalysis is preferred.

When catalysts are employed, they are used in sufficient quantity to ensure the desired degree of completion of the reaction, over a selected period of time. To shorten the reaction time, a greater amount of catalyst may be used, and the reverse is true as well. Catalysts may be present, preferably, in amounts of 0.001 parts to 10 parts per 100 parts of (A) plus (B) plus optional (C), preferably 0.005 to 1 part, and most preferably from 0.01 to 0.5 parts, on a weight basis. Larger or smaller amounts are also suitable, depending upon the reaction conditions, the reactivity of the various reactive species, the desired processing time, and the activity of the catalyst.

Suitable amounts can readily be determined by one skilled in the art through lab scale preparations, without undue experimentation.

Suitable catalysts include all those active in condensation reactions between silanol groups and alkoxy groups. Suitable catalysts include organic amines and carboxylic acid salts of many metals such as Pb, Zn, Zr, Sb, Fe, Cd, Sn, Ba, Li, Na, K, Rb, Ca, and Mn, such as the acetates, octoates, 2-ethylhexoates, and laurates; alkali metal and alkaline earth metal oxides and hydroxides, preferably sodium hydroxide and potassium hydroxide; alkali metal carbonates such as sodium and potassium carbonate; organo tin compounds; organo bismuth compounds; titanium compounds such as tetrabutyltitanate; metal alcoholates such as sodium methoxide and potassium methoxide, and their higher alcoholate analogues; tetraorganoammonium and phosphonium salts such as tetramethylammonium hydroxide and tetrabutylammonium hydroxide; metal chelates such as metal acetylacetonates; strong bases other than hydroxides and alkoxides; phosphonitrilic chlorides, etc. Many such catalysts are known, and may be readily identified in the patent and non-patent literature. Preferred catalysts are quaternary ammonium hydroxides, alkali metal hydroxides, and alkali metal alkoxides. Sodium hydroxide, sodium methoxide, and tetramethylammonium hydroxide have been found to be particularly useful.

When catalysts are used, they may in general be inactivated following the reaction. Methods of inactivation include removal of the catalyst from the reaction mixture, neutralization of the catalyst, or thermal deactivation of the catalyst. Solid catalysts which are insoluble in the reaction mixture may be removed by common methods such as filtration or centrifugation. Basic catalysts may be fully or partially neutralized, for example hydrochloric acid or acetic acid may be used to neutralize sodium hydroxide or sodium methoxide catalysts. Some catalysts are heat labile, and may be inactivated by heating the produced mixture to a temperature at which the catalysts reacts or decomposes to form catalytically inactive species. All these methods are widely known and conventionally used.

It is important that a compound (E) having hydroxyl functionality be present in at least a portion of the stage of the reaction where the aminoalkyltrialkoxysilane (B) is present. The compound (E) may be added early in the overall reaction, e.g. when compounds (A) and optional (C) are first admixed with (B), or when compounds (A) and (B) are first mixed; may be added just prior to heating the reactive components; or may be added at a later stage, e.g. following addition and partial reaction of component (B) with component (A), but prior to completion of the reaction between (B) and (A). The hydroxyl-functional compound is preferably added at an early stage, preferably when (A) and (B) are first mixed together, or following their admixture but prior to heating to a temperature sufficient for the condensation to proceed sufficiently.

Suitable hydroxyl-functional compounds are preferably those of the formula $R^5(OH)_m$ where m is from 1 to 8, preferably 1 to 4, and more preferably 1 to 2, most preferably 1, and $R^5$ is an organic group, preferably an m-valent alkyl group. $R^5$ may also be aromatic, e.g. compounds such as phenol, hydroquinone, or catchetol may be used. However, $R^5$ is preferably alkyl or alkylene. Examples include methanol, ethanol, isopropanol, 1-butanol, 2-butanol, t-butanol, amyl alcohol, 1-butynol, cyclohexanediol, neopentylglycol, ethylene glycol, propylene glycol, tri-, tetra- and pentaethylene glycols and their higher analogues, monoethers and monoesters of alkylene glycols and polyoxyalkylene glycols, and the like. Also suitable are alkanolamines, for example monoalkanolamines such as ethanolamine, dialkanolamines such as diethanolamine, and trialkanolamines and higher analog such as triethanolamine, N,N,N',N'-tetraethanolethylene diamine, and the like. the alcohol functional amine may contain N-bound organic groups, particularly $C_{1-18}$ alkyl groups, $C_{5-10}$ cycloalkyl groups, or $C_{6-10}$ aryl groups, optionally substituted by non-reactive groups such as halo, cyano, alkyl, alkenyl, and the like. These hydroxyl-functional compounds thus may contain groups of the formula

$R_o R^6_p N$ where R is defined previously, $R^6$ is a hydroxyl group-consisting organo group, preferably a hydroxyalkyl group where the alkyl group contains from 2 to 18 carbon atoms, o is 0, 1, or 2 and p is 1, 2, or 3, with the proviso that the sum of o+p is not more than 3 when N is not bound to another group, and not more than 2 when N is bonded to another group, for example to an alkyleneamino group. Thus, in general, alkanol-functional amines, alkanol-functional alkylene diamines, and alkanol-functional poly(alkyleneamines) are all suitable.

Most preferably, the hydroxyl-functional compounds (E) are low molecular weight compounds having molecular weights of less than 500 g/mol, more preferably less than 300 g/mol, yet more preferably less than, in increasing order of preference, 250 g/mol, 200 g/mol, 150 g/mol and less than 100 g/mol. Also preferable are hydroxyl-functional compounds having boiling points of less than 150° C., more preferably less than 100° C., and yet more preferably less than 80° C. at standard pressure, and preferably less than 110° C., more preferably less than 100° C., and yet more preferably less than 80° C. at a reduced pressure to which the reaction mixture is exposed during the course of the reaction. Further suitable are monosilanols such as trimethylsilanol, 1-hydroxypentamethyldisiloxane, and the like. The hydroxyl-functional compounds (E) do not include disilanols with 10 or more repeating siloxy groups, since these are reactive and their silanol groups disappear as the reaction proceeds, and as the concentration of OH groups is too low so as to be able to be used in a sufficiently low quantity.

Preferably, the hydroxyl-functional compound is a low molecular weight, volatile compound which can be volatilized from the product mixture, preferably following catalyst deactivation. Removal preferably takes place at room temperature or moderately elevated temperature, e.g. up to 150° C., preferably 100° C. or below, at atmospheric pressure or under vacuum, with or without sparging with gas such as nitrogen. When the product requirements allow, all or a substantial portion of the hydroxyl functional compound (E) may remain in the product mixture. Some or all of the added hydroxyl functional compound may become covalently bound in the product polymer.

The amount of hydroxyl-functional component (E) added is an amount effective to avoid undesirable increases in viscosity and/or gelling on a repeated basis. The amount for any particular condensation reaction will vary with the amounts and nature of the raw materials (A), (B), and (C), the amount and nature of the catalysts (D), the regulating activity of the hydroxyl-functional compound (E), the reaction temperature, the reaction pressure, and expected excursions of these parameters from their set values. The amounts which are effective can be obtained from laboratory scale preparations, without undue experimentation.

However, amounts of from 0.1 weight percent to 10 weight percent, more preferably 0.5 to 5 weight percent, yet more preferably 0.5 to 3 weight percent, and most preferably 0.5 to 2 weight percent of hydroxyl-functional component (E) have proven particularly effective, these weight percentages based on an equivalent weight of 50 for the hydroxyl-functional component (E), with hydroxyl-functional components (E) of lower or higher equivalent weight being used in correspondingly higher or lower proportions.

The condensation reaction generally takes place at a temperature from room temperature or below to 150° C. or higher, more preferably 30° C. to 100° C., and most preferably from 50° C. to 100° C., for a period of 30 minutes or less to 4 hours or more, preferably from 45 minutes to 2 hours. The completion of the reaction may be assessed by $^{29}$Si NMR, $^1$H NMR or by other methods but this is generally not required. The reaction time will be dependent upon the nature of the catalyst, its amount, the temperature of the reaction, and other factors known to one skilled in the art.

The amounts of disilanol (A) and aminoalkyltrialkyoxysilane (B) used will depend upon the molecular weight of the disilanol and the desired degree of aminoalkyl functionality desired, and can vary within a wide range. Preferably, per 100 parts of disilanol (A), from 1 to 40 parts by weight of aminoalkyltrialkyoxysilane (B) is used, more preferably 5 to 30 parts by weight, and yet more preferably 10 to 25 parts by weight.

The reaction may take place neat or in the presence of a non-hydroxylic organic solvent, preferably neat. When organic solvents are used, preferred organic solvents are those in which the starting materials and product are soluble. Examples include hydrocarbon solvents such as lower alkanes or mixtures thereof such as hexane, heptane, and petroleum ether, aromatic solvents such as benzene, toluene, and xylene, cycloalkanes such as cyclohexane, ethers such as diethylether and tetrahydrofuran, ketones such as methylethylketone and diethylketone, lower alkyl carboxylic acid esters such as methylacetate, ethylacetate, and aprotic solvents such as dimethylformamide and dimethylsulfoxide. When organic solvents are used, they are more preferably substantially volatile solvents, preferably having boiling points less than 150° C., more preferably less than 115° C., and most preferably less than 100° C., at atmospheric pressure. Solvents are preferably not used.

The reaction is conducted substantially anhydrous, i.e. in the substantial absence of water, as indicated below. It is possible to add small amounts of water, for example when employing catalysts such as KOH, supplied in aqueous solution, but water is generally avoided except in this case. The amount of water contained in the reaction mixture, including that supplied with catalyst, is preferably less than 2 weight percent based on the weights of (A), (B), and optionally (C), more preferably in increasing order of preference, less than 1%, less than 0.5%, less than 0.2%, less than 0.1%, and most preferably less than 0.05%. If traces of water are desired to be removed, e.g. the water content is to be further lowered, the reaction mixture may be passed at low temperature, i.e. room temperature or a temperature at which the condensation reaction proceeds not at all or poorly, through a water absorbent column, i.e. one containing anhydrous silica or molecular sieves. This is generally not necessary. The reaction is preferably blanketed with dry inert gas such as $CO_2$, Ar, or $N_2$. Since the reaction is preferably conducted at modest vacuum, e.g. 200-600 torr, any water present will be at least partially removed during heating of the reactants. Alcohol liberated by the condensation will be removed as well.

The invention will now be illustrated by the following examples.

Example 1

To a three neck round bottom flask equipped with stirrer, condenser, and heating mantle was charged 400 g of an α,ω-disilanol stopped polydimethylsiloxane fluid having a viscosity of 80 mm$^2$/s and a weight average molecular weight, based on this viscosity, of about 3700 g/mol. To the disilanol fluid was added 80 g of N-(2-aminoethyl)-3-aminopropyltrimethoxysilane, 6 g of methylbutynol, and 0.1 g of 50% aqueous KOH as a condensation catalyst. The flask was heated while stirring to 85° C. under light vacuum (600 torr) over approximately 40 minutes, after which the pressure was lowered to 400 torr. Heating continued to 105° C. and then was slowly reduced while the pressure was gradually lowered to 200 torr. Samples were withdrawn one hour from the beginning of the reaction, and at two hours and three hours. The respective viscosities were 91.2 mm$^2$/s, 114.6 mm$^2$/s, and 117 mm$^2$/s. The product mixture was then cooled, and 0.06 g of glacial acetic acid was added to neutralize the catalyst.

Example 2

The general procedure of Example 1 was followed, but with 751 g α,ω-disilanol stopped polydimethylsiloxane, 150 g of N-(2-aminoethyl)-3-aminopropyltrimethoxysilane, 11.2 g of methanol, and 0.898 g of a 25% by weight aqueous solution of tetramethylammonium hydroxide catalyst. A pressure of 500 torr was set at 40° C. and was decreased gradually over two hours to 200 torr, while at the same, the temperature was increased gradually to 150° C. The reaction mixture was cooled to 75° C. and an additional 1.8 g of TMAH added, and the flask was reheated to 150° C. over a period of about one hour. Slight foaming was noted. The product was cooled, and was a light yellow oil with a slight haze, viscosity 204 mm$^2$/s.

Comparative Example C1

The general procedure of Example 2 was followed, but no methanol was added. The charge was 50 g α,ω-disilanol stopped polydimethylsiloxane, 10 g N-(2-aminoethyl)-3-aminopropyltriethoxysilane, and 0.06 g 25% TMAH. The mixture was heated to 85° C. and maintained there for five minutes and then heated to 95-100° C. and held for five minutes. Slight foaming was noticed. Upon cooling, the material gelled.

Example 3

The general procedure of Example 1 was followed, with 400 g α,ω-disilanol stopped polydimethylsiloxane, 80 g N-(2-aminoethyl)-3-aminopropyltrimethoxysilane, 6 g trimethylsilanol as the hydroxyl group containing compound, and 0.1 g 50% aqueous KOH. The reaction pressure was maintained at 600 torr throughout. The temperature was gradually increased to 100° C. over a period of approximately one hour, and then maintained at 93-94° C. for three hours. Viscosity reached 122 mm$^2$/s after two hours from the start of the reaction, 127 mm/s one hour later, and 129 mm$^2$/s after about four hours. The mixture was cooled and the catalyst deactivated with 0.06 g glacial acetic acid.

Example 4

Example 3 was repeated, but with 6 g isopropanol rather than trimethylsilanol. The pressure was 600 torr throughout, the maximum temperature was 95° C., and the time of the reaction was about 50 minutes from 55° C. to 95° C. After cooling and catalyst neutralization, the viscosity was 78.4 mm$^2$/s. $^1$H NMR showed 89.43% of D and D$^A$ groups, 3.32% methoxy groups, 1.66% isopropoxy groups, and only 0.02% SiOH groups Example 5

Example 4 was repeated, but with 6 g of Dowanol® DB glycol instead of isopropanol. The product viscosity was 200 cs.

Example 6

The general procedure of Example 1 was followed, with 400 g α,ω-disilanol stopped polydimethylsiloxane, 80 g N-(2-aminoethyl)-3-aminopropyltrimethoxysilane, 7.5 g triethanolamine as the hydroxyl group containing compound, and 0.1 g 50% aqueous KOH. The pressure was reduced to 600 torr as the reactants were heated to 65° C., and then heated to 100° C. over a period of 70 minutes while the pressure was gradually reduced to 250 torr. An aliquot sample had a viscosity of 237 mm$^2$/s. The temperature and pressure were then reduced to 98° C. and 200 torr, respectively, over about 45 minutes, and the viscosity was measured to be 270 mm$^2$/s. Further reduction of temperature and pressure to 87° C. and 170 torr over a half hour led to a viscosity of 420 mm$^2$/s. The flask was then cooled to room temperature, the vacuum released, and the product decanted.

The Examples above show that the addition of minor amounts of hydroxylic substances to the condensation of disilanols with aminoalkyltrialkoxy silanes prevents excursions of viscosity which occur in their absence, and that this is so even with extended reaction times.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for producing aminoalkyl-functional organopolysiloxanes, without gelation, comprising:
condensing at least one organopolysiloxane (A) bearing at least two silanol groups with an aminoalkyltrialkoxysilane (B) in the substantial absence of water, and, prior to or during condensing, adding an effective amount of a gelation-preventing hydroxyl group-containing substance other than organopolysiloxanes (A), and recovering a liquid aminoalkyl-functional organopolysiloxane wherein the hydroxyl group-containing substance is a C$_{1-4}$ alkanol.

2. The process of claim 1, wherein the organopolysiloxane bearing at least two silanol groups is an α,ω-dihydroxypolydiorganosiloxane.

3. A process for producing aminoalkyl-functional organopolysiloxanes, without gelation, comprising:
condensing at least one organopolysiloxane (A) bearing at least two silanol groups with an aminoalkyltrialkoxysilane (B) in the substantial absence of water, and, prior to or during condensing, adding an effective amount of a gelation-preventing hydroxyl group-containing substance other than organopolysiloxanes (A), and recovering a liquid aminoalkyl-functional organopolysiloxane, wherein the hydroxyl group containing substance comprises at least one of an alcohol, glycol, alkanolamine or monosilanol.

4. The process of claim 1, further comprising adding a condensation catalyst during or prior to condensing.

5. The process of claim 1, wherein the hydroxyl group-containing substance is present in an amount of 0.1 to 10 parts by weight based on 100 parts by weight of (A) plus (B).

6. The process of claim 1, wherein a further alkoxy group-containing silane (C) which is different from the aminoalkyltrialkoxysilane (B) is also condensed.

7. The process of claim 1, wherein the hydroxyl group-containing substance is a C$_{3-4}$ alkanol.

8. The process of claim 1, wherein the hydroxyl group-containing substance has a molecular weight of less than 500 g/mol.

9. The process of claim 1, wherein the alkoxy groups of the aminoalkyltrialkoxysilane are methoxy or ethoxy groups.

10. The process of claim 1, wherein the alkoxy groups of the aminoalkyltrialkoxysilane are methoxy groups.

11. The process of claim 1, wherein at least a portion of condensing takes place in a temperature range of from 60° C. to 150° C.

12. A process for producing aminoalkyl-functional organopolysiloxanes, without gelation, comprising:
condensing at least one organopolysiloxane (A) bearing at least two silanol groups with an aminoalkyltrialkoxysilane (B) in the substantial absence of water, and, prior to or during condensing, adding an effective amount of a gelation-preventing hydroxyl group-containing substance other than organopolysiloxanes (A), and recovering a liquid aminoalkyl-functional organopolysiloxane, wherein at least a portion of condensing takes place at a pressure in the range of 600 torr or less.

13. The process of claim 3, wherein at least one hydroxyl group-containing substance is a monosilanol.

14. The process of claim 3, wherein at least one hydroxyl group-containing substance is a glycol.

15. The process of claim 3, wherein the hydroxyl group-containing substance is an alkanol-functional amine, alkanol-functional alkylene diamine, alkanol function poly(alkyleneamine), or mixture thereof.

\* \* \* \* \*